Aug. 19, 1969

C. J. HOLTKAMP 3,462,583

MOUNTING ARRANGEMENT FOR SMOKE ELIMINATOR HEATER FOR
HEAT-CLEANING COOKING OVEN
Filed Oct. 19, 1967

WITNESSES
Theodore F. Wrobel
James F. Young

INVENTOR
Calvin J. Holtkamp
BY Edward C. Gregg
ATTORNEY

United States Patent Office 3,462,583
Patented Aug. 19, 1969

1

3,462,583
MOUNTING ARRANGEMENT FOR SMOKE ELIMINATOR HEATER FOR HEAT-CLEANING COOKING OVEN
Calvin J. Holtkamp, Mansfield, Ohio, assignor to Westinghouse Electric Corporation, Pittsburgh, Pa., a corporation of Pennsylvania
Filed Oct. 19, 1967, Ser. No. 676,447
Int. Cl. F27d 11/02
U.S. Cl. 219—402  3 Claims

ABSTRACT OF THE DISCLOSURE

Mounting arrangement for a heater in a heat-cleaning oven of the type in which the heater is located closely below an apertured plenum into which combustion products from the oven pass, the heater being supported from the lower wall of the plenum by wire stitching or staples, the heater being spaced from the lower wall of the plenum by a wire mesh sandwiched between the heater and the wall.

BACKGROUND OF THE INVENTION

Field of the invention

The invention pertains to the art of smoke eliminators for heat-cleaning cooking ovens.

DESCRIPTION OF THE PRIOR ART

U.S. patent application S.N. 552,663 filed Apr. 26, 1966 discloses and claims a smoke eliminator arrangement for a heat-cleaning cooking oven in which the smoke elimination is effected by the provision of an electrical heating element in a location closely underlying the top wall of the oven, with the top wall being provided with vent opening means arranged to coincide with the array of the heating element. In this arrangement the heating element, in addition to performing its normal heating function in certain operations of the oven, also provides a smoke eliminating function as the smoke and cooking odors sweep thereover and out through the vent opening means. The mounting arrangement for the heating element as disclosed in that patent application, and as embodied in current commercial apparatus produced by the assignee of that invention, comprises a series of cross stringers extending transverse to the main run lengths of the heating element and provided with notches to accommodate these heating element runs. A strap is secured along each stringer to capture the run of the heating element in these notches. A smoke eliminator heating element of that fashion performs satisfactorily but is expensive to manufacture, mainly because of a high labor and piece cost.

SUMMARY OF THE INVENTION

The principal object of this invention is the provision of an improved mounting arrangement for the smoke eliminator heater which lends itself to a substantially reduced manufacturing cost, and which improves smoke elimination performance.

This object is accomplished in accordance with the invention by fastening the heater to the lower wall of the plenum by wire stitching or wire stapling, and by providing spacing means between the heater and the lower wall of the plenum in the form of a planar, openwork wire form means sandwiched between the heater and the plenum lower wall.

DRAWING DESCRIPTION

PREFERRED EMBODIMENT

Figure 1:
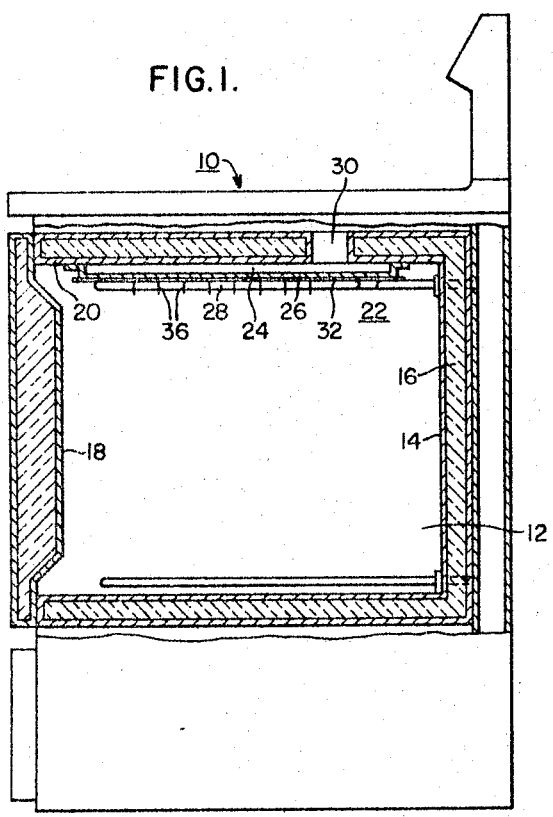
FIGURE 1 is a partly broken side view of a range including a heat-cleaning oven incorporating the heater mounting arrangement of the invention.

FIGURE 1 illustrates a representative type of cooking range 10 in which the smoke eliminator of the invention may be incorporated. Only those parts of the construction bearing reasonably directly upon an understanding of the invention will be noted herein, and reference should be had to the noted patent application for a fuller explanation of the operation of the heat cleaning oven as a whole. For purposes of understanding this invention, the oven cavity 12 is defined on all sides except the front by an oven liner 14 about which heavy thermal insulation 16 is provided. The front opening of the cavity is closed during cooking and during the heat cleaning operation by the heavily insulated door 18.

The top wall 20 of the oven liner has secured thereto a shallow, pan-shaped member 22 which, with the liner top wall 20 generally defines an exhaust plenum 24. The lower wall 26 supports a heating element 28 closely therebelow. This heater 28 is the source of heat for broiling and operates at a reduced rate for baking. In accordance with the teachings of the noted patent application, the heater 28 is a source of heat for carrying out a heat cleaning operation in the oven cavity, and also serves as a smoke eliminator and oxidizing element for the gaseous products generated during a heat cleaning cycle of the oven. These gaseous products are subject to further oxidation by the high heat they encounter as they sweep closely by the heater 28 and into the plenum 24 before passing through the outlet vent 30 into the room.

Figure 2:
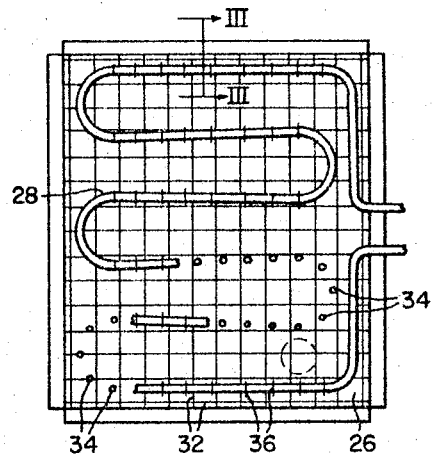
FIG. 2 is a bottom view of the plenum with the heater mounted thereon in accordance with the invention.
Figure 3:
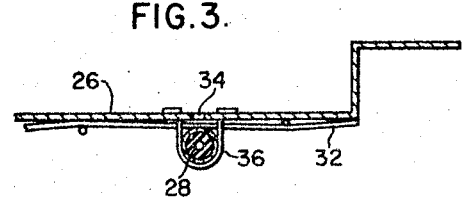
FIG. 3 is an enlarged vertical section view corresponding to one taken along the line III—III of FIG. 2.
Figure 4:
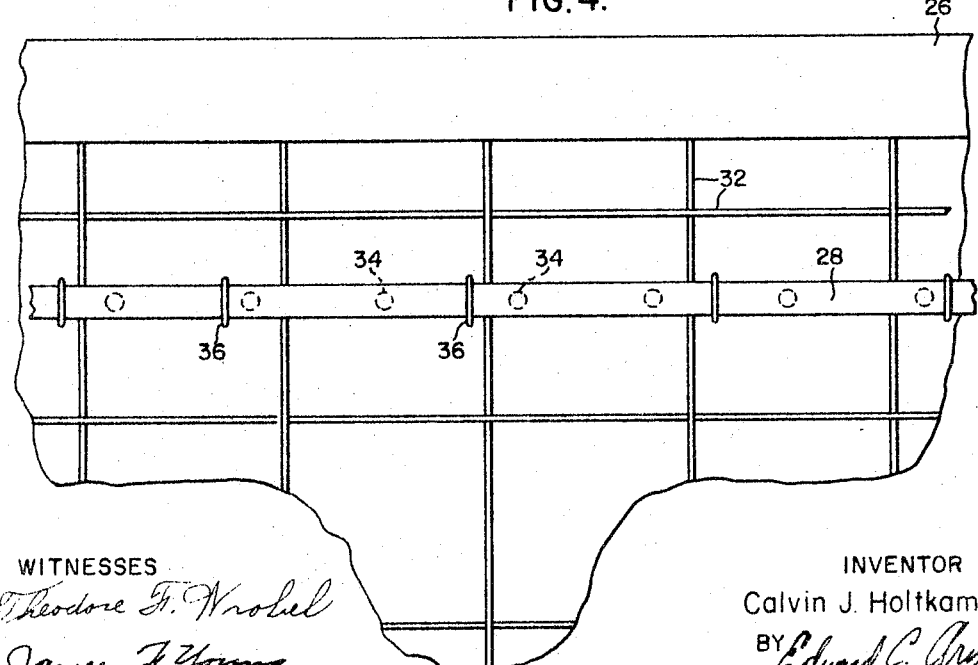
FIG. 4 is a bottom view of the lower wall of a fragmentary portion of the plenum, also enlarged with respect to FIG. 2.

Referring to FIGS. 2–4, the heater 28 is fastened to the lower wall 26 of the plenum by being stitched or stapled thereto. A wire mesh screen 32 in flat sheet form is placed between the heater and the plenum wall 26 before stitching to space the heater apart from the series of holes 34 provided in the plenum wall 26 in an array coincident with the array of the heater. Thus the screen 32 is sandwiched between the heater 28 and the plenum wall 26. The wire mesh screen 32 is of a heat resistive material such as stainless steel or an aluminum coated wire. A mesh providing satisfactory operation is one in which the parallel wires are spaced apart approximately two inches and the wire diameter is approximately 0.030 inch. These dimensions are given for purposes of example only, it being contemplated that for practical purposes the mesh openings could vary in the order of ¼″ to 4″, and the diameter of the wire could vary from 0.010″ to 0.100″. In any event, the wire mesh serves to space the heater apart from the lower wall 26 a sufficient distance that an adequate amount of air can flow into the holes 34 without undue restriction, but while passing sufficiently close to the heater to provide effective oxidation of the products of combustion produced during a heat cleaning cycle.

It is contemplated that the best mode for stitching the heater to the plenum wall is by means of individual staple-form stitches 36 provided for the most part along those straight run lengths of the heater 28 which are generally oriented in a front-to-rear direction. It will be appreciated that the wire stitching could also be provided in the form of an unbroken length of wire for each straight run of the heater, successive lengths of wire forming loops progressing along the heater length. To accommodate differential expansion and contraction between the heater and the plenum wall 26, it is preferred that the stitching be provided only along the front-to-rear lengths of the heater.

It will be further appreciated that with the inventive concept in mind, that for normal mass production assembly techniques, machine stitching is utilized, and an assembly fixture is used to properly align the heater relative to the holes 34 in the plenum so that the heater pattern and hole pattern coincide.

The arrangement according to the invention is adapted to yield an improved smoke elimination performance because of the close heater to plenum spacing. The uniformity of the product is improved due to the uniformity of the wire diameter of the screen mesh. The mounting arrangement according to the invention is also advantageous from the standpoint of utilizing the established oven and plenum structure rather than requiring any substantial changes therein to accommodate the mounting arrangement according to this invention. Finally, the mounting invention according to the invention provides an installed appearance and compactness superior to that taught in the noted patent application.

While the description has proceeded in connection with the current preferred best mode, it will be appreciated that the wire mesh screen may take the form of a sheet of expanded or perforated metal for example, or other filamentary forms which can be held in place by the clamping effect of the stitches. However, it is expected that for practical purposes a wire mesh configuration similar to hardware cloth, and in which both weft and warp strands are secured to each other to form a unitary sheet, will be the favored configuration.

I claim:

1. In a heat cleaning cooking oven having a smoke eliminator of the character in which a heating element is disposed closely below a lower wall of a plenum having holes arrayed therein coincident with the heating element array, a mounting and spacing arrangement for said element, comprising:

open-work wire form means disposed between said heating element and said lower wall; and means securing said heating element to said lower wall and clamping said wire form means therebetween.

2. An arrangement according to claim 1 wherein: said securing means comprises wire stitches.

3. In an arrangement according to claim 1 wherein: said wire form means comprises a flat sheet of wire screen mesh.

References Cited

UNITED STATES PATENTS

| | | | |
|---|---|---|---|
| 2,300,837 | 11/1942 | Ames | 219—392 |
| 2,508,357 | 5/1950 | Ames | 219—461 |
| 3,290,483 | 12/1966 | Hurko | 219—409 X |
| 3,350,542 | 10/1967 | Getman | 219—412 |
| 2,846,557 | 8/1958 | Schulze et al. | 219—403 X |
| 1,894,875 | 1/1933 | Knapp | 219—402 |
| 2,922,018 | 1/1960 | Walkoe | 219—393 |

BERNARD A. GILHEANY, Primary Examiner

H. B. GILSON, Assistant Examiner

U.S. Cl. X.R.

219—412